(12) United States Patent
Koo et al.

(10) Patent No.: US 10,328,986 B2
(45) Date of Patent: Jun. 25, 2019

(54) FOLDING PERSONAL MOBILITY VEHICLE

(71) Applicants: Hyundai Motor Company, Seoul (KR); Kia Motors Corporation, Seoul (KR)

(72) Inventors: Dong Han Koo, Seoul (KR); Jae Young Choi, Seongnam-si (KR); Jun Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 75 days.

(21) Appl. No.: 15/643,689

(22) Filed: Jul. 7, 2017

(65) Prior Publication Data

US 2018/0170473 A1 Jun. 21, 2018

(30) Foreign Application Priority Data

Dec. 16, 2016 (KR) .................. 10-2016-0172246

(51) Int. Cl.
*B62K 3/00* (2006.01)
*B62K 15/00* (2006.01)

(52) U.S. Cl.
CPC ............ *B62K 3/002* (2013.01); *B62K 15/006* (2013.01); *B62K 15/008* (2013.01); *B60Y 2200/126* (2013.01); *B62K 2700/56* (2013.01)

(58) Field of Classification Search
CPC .... B62K 3/002; B62K 15/006; B62K 15/008; B62K 2700/56; B60Y 2200/126
See application file for complete search history.

(56) References Cited

U.S. PATENT DOCUMENTS

| | | |
|---|---|---|
| 2010/0044137 A1 | 2/2010 | Atherton et al. |
| 2012/0018968 A1* | 1/2012 | Joslin .................. B62K 3/002 280/87.041 |
| 2012/0104714 A1* | 5/2012 | Sapir .................. B62K 3/002 280/87.05 |
| 2012/0256386 A1* | 10/2012 | Benarrouch .......... B62K 3/002 280/87.05 |
| 2015/0084312 A1* | 3/2015 | Schreuder ............ B62K 3/002 280/639 |
| 2017/0073032 A1* | 3/2017 | Mei .................... B62K 15/008 |
| 2018/0118299 A1* | 5/2018 | Lu ...................... B62K 3/002 |

FOREIGN PATENT DOCUMENTS

| | | |
|---|---|---|
| CN | 104743033 A | 7/2015 |
| DE | 10045821 A1 | 3/2002 |
| EP | 2780219 A1 | 9/2014 |
| KR | 20160033582 A | 3/2016 |
| KR | 20160033634 A | 3/2016 |
| WO | 2016043556 A1 | 3/2016 |

* cited by examiner

*Primary Examiner* — Darlene P Condra
(74) *Attorney, Agent, or Firm* — Slater Matsil, LLP (57) ABSTRACT

A folding personal mobility vehicle includes a foothold part provided with a wheel, a handle part provided with a handle, and a hinge structure between the foothold part and the handle part. The foothold part and the handle part are each configured to be folded using the hinge structure and the foothold part and the handle part are configured so that the foothold part is positioned between the handle parts in a folded state.

20 Claims, 6 Drawing Sheets

FOLDING PERSONAL MOBILITY VEHICLE

CROSS-REFERENCE TO RELATED APPLICATIONS

The present application claims priority to Korean Patent Application No. 10-2016-0172246, filed on Dec. 16, 2016, the entire contents of which is incorporated herein for all purposes by this reference.

TECHNICAL FIELD

The present invention relates to a folding personal mobility vehicle.

BACKGROUND

Recently, the development of single-person vehicles called personal mobility is on the rise to cope with a problem of environmental pollution and an increasing demand due to a fun to use.

As an example of a personal mobility vehicle, a carrying device called a kick board has been widely used. The kick board largely includes a foothold part provided with a wheel and a handle part provided with a handle and a length of the handle part is generally longer than that of the foothold part.

Most of the existing personal mobility vehicles including the foothold part and the handle part like the kick board do not have a folding structure, and therefore has a difficulty in carrying and take up a lot of space for storage.

As another example, a personal mobility vehicle having a length-varying structure like a sliding type has a minimum overlapping section along a longitudinal direction in which it is slid in order to secure rigidity. Therefore, as the length is not reduced to the maximum due to the overlapping section, there is still a disadvantage in that the personal mobility vehicle takes up a lot of space for storage.

As another example, a folding structure of a general hinge type has an empty space present between components that are folded to overlap. Therefore, as a volume is not reduced to the minimum even in the folded state due to the empty space, there is still a disadvantage in that the personal mobility vehicle also takes up a lot of space for storage.

The contents described as the related art have been provided only for assisting in the understanding for the background of the present invention and should not be considered as corresponding to the related art known to those skilled in the art.

SUMMARY

Embodiments of the present invention relate to a folding personal mobility vehicle and particular embodiments relate to a folding personal mobility vehicle that may be easily carried and stored even in a narrow space.

Embodiments of the present invention provide a folding personal mobility vehicle having a hinge structure capable of preventing an empty space from being present between components overlapping in a folded state to minimize a volume of the folded state, thereby being effectively stored even in a narrow space and easily carried.

According to an exemplary embodiment of the present invention, a folding personal mobility vehicle includes a foothold part provided with a wheel and a handle part provided with a handle. The foothold part and the handle part may be each configured to be folded using a hinge structure. The foothold part and the handle part may be in the folded state so that the foothold part is positioned between the handle parts.

When the foothold part is folded to be positioned between the handle parts, the handle part and the foothold part may adhere to each other and the foothold parts may adhere to each other along an overlapping direction to prevent an empty space from being present between the handle part and the foothold part and between the foothold parts.

The handle may be folded to adhere to a side surface of the handle part in a state in which the foothold part is folded to be positioned between the handle parts.

According to another exemplary embodiment of the present invention, a folding personal mobility vehicle includes a foothold part provided with a wheel and a handle part provided with a handle. The foothold part may include a front foothold part having a wheel carrier coupled with a front thereof and having a front wheel coupled with the wheel carrier The foothold part may also include a rear foothold part rotatably coupled with the front foothold part via a hinge shaft, having a rear wheel coupled with a rear thereof, and folded to adhere to the front foothold part. The handle part may include a lower handle part coupled with the wheel carrier via a hinge locking mechanism, a middle handle part coupled with the lower handle part via the hinge locking mechanism, and an upper handle part coupled with the middle handle part via the hinge locking mechanism. A pair of handles may be coupled with the upper handle part via the hinge locking mechanism.

The folding personal mobility vehicle may further include a foothold locking mechanism provided on the foothold part to fix an unfolded state of the front foothold part and the rear foothold part.

The middle handle part may be coupled with a carrying handle.

The front foothold part may be provided with a wheel groove into which a rear wheel is inserted when the rear foothold part is folded to adhere to the front foothold part.

The rear foothold part may be folded to adhere to the front foothold part, the lower handle part may be folded to adhere to the rear foothold part, the middle handle part may be folded to be positioned at one side of the front foothold part and one side of the rear foothold part, the upper handle part may be folded to adhere to a bottom surface of the front foothold part, and the handle may be folded to adhere to both side surfaces of the upper handle part.

The lower handle part and the middle handle part and the upper handle part and the handle that are in the folded state may be each maintained in a folded state by the hinge locking mechanism.

An upper end of the wheel carrier and a lower end of the lower handle part, an upper end of the lower handle part and a lower end of the middle handle part, an upper end of the middle handle part and a lower end of the upper handle part, and an upper end of the upper handle part and one end of the handle may each be a hinge part that performs a folding operation of the handle part, the hinge part may be configured so that a left flange and a right flange overlap with each other at left and right sides, having an inner flange disposed therebetween, the left flange and the right flange may be configured to be separated from the inner flange while having an integrated structure in which they are connected to each other like a yoke shape, and the hinge locking mechanism may be installed at a portion where the inner flange, the left flange, and the right flange overlap with each other.

The hinge locking mechanism may include a locking pin having a pressing part of one end, a locking part of the other end and a rod part connecting between the pressing part and the locking part; and a locking spring for elastically supporting the locking part of the locking pin, and the pressing part may be movable along a longitudinal direction of the rod part while being inserted into an operating groove formed at the right flange, the locking part may be installed to be separated from the locking groove at the time of pressing the pressing part while being installed to be simultaneously inserted into the locking groove formed at the inner flange and a release groove formed at the left flange, the rod part may be installed to connect between the pressing part and the locking part by penetrating through the right flange and the inner flange, and the locking spring may have one end supported to the locking part and the other end supported into the release groove to press the locking part toward the pressing part by an accumulated elastic force.

If the pressing part is pressed and thus the locking part is separated from the locking part, the inner flange and the left flange and the right flange that are integrated may relatively rotate with respect to the rod part, and the folding operation of the handle part may be performed by the rotation between the inner flange and the left flange and the right flange that are integrated.

The locking part and the locking groove may have an outer circumference having a quadrangular cross section and thus the locking part may rotate by 90° when the inner flange and the left flange and the right flange that are integrated relatively rotate with respect to the rod part and then may be maintained in the locked state.

A rear upper edge part of the front foothold part and a front upper edge part of the rear foothold part may be rotatably coupled with each other via the hinge shaft while overlapping with each other, and the foothold locking mechanism may include a locking lever rotatably installed at a rear lower edge part of the front foothold part via a lever shaft; a locking protruding groove formed at a front lower edge part of the rear foothold part so that a locking protrusion formed at one end of the locking lever is inserted into the locking protruding groove and locked; and a lever spring having one end fixed to the front foothold part and the other end fixed to the lever shaft while being wound around the lever shaft and applying an elastic force so that the locking lever rotates in a direction in which the locking protrusion is inserted into the locking protruding groove.

In the state in which the rear foothold part is folded to adhere to the front footstep part, the lower handle part is folded to adhere to the rear foothold part, the middle handle part is folded to be positioned at one side of the front foothold part and one side of the rear foothold part, and the upper handle part is unfolded to extend along the longitudinal direction of the front foothold part, a user may hold the handle to bring the front wheel into contact with a ground surface and may then drag the folding personal mobility vehicle.

The foothold part and the handle part may overlap with each other by being completely folded and then the carrying handle provided on the middle handle part may protrude outwardly and the user may carry the folded personal mobility vehicle using the carrying handle.

DETAILED DESCRIPTION OF ILLUSTRATIVE EMBODIMENTS

Hereinafter, a folding personal mobility vehicle according to an exemplary embodiment of the present invention will be described with reference to the accompanying drawings.

Referring to FIGS. 1 to 6, a folding personal mobility vehicle according to an exemplary embodiment of the present invention includes a foothold part 100 provided with a wheel 10 and a handle part 200 provided with a handle 20, in which the foothold part 100 and the handle part 200 may each be folded by using a hinge structure and the foothold part 100 and the handle part 200 are in the folded state so that the foothold part 100 is positioned between the handle parts 200.

When the foothold part 100 is folded to be positioned between the handle parts 200, the handle part 200 and the foothold part 100 adhere to each other and the foothold parts 100 adhere to each other along the overlapping direction to prevent an empty space from being present between the handle part 200 and the foothold part 100 and between the foothold parts 100 and the handle 20 has a structure so that the handle 20 is folded to adhere to a side surface of the handle part 200 in the state in which the foothold part 100 is folded to be positioned between the handle parts 200.

Describing in more detail the folding personal mobility vehicle according to the exemplary embodiment of the present invention, the foothold part 100 includes a front foothold part 110 having a wheel carrier 30 coupled with a front thereof and having a front wheel 11 coupled with the wheel carrier 30 and a rear foothold part 130 rotatably coupled with the front foothold part 110 via a hinge shaft 120, having a rear wheel 12 coupled with a rear thereof, and folded to adhere to the front foothold part 110.

The handle part 200 includes a lower handle part 210 coupled with the wheel carrier 30 via a hinge locking mechanism 40, a middle handle part 220 coupled with the lower handle part 210 via the hinge locking mechanism 40, and an upper handle part 230 coupled with the middle handle part 220 via the hinge locking mechanism 40.

The handle 20 is formed in pair to be coupled with both sides of the upper handle part 230 via the hinge locking mechanism 40.

Further, the folding personal mobility vehicle according to an exemplary embodiment of the present invention further includes a foothold locking mechanism 50 provided on the foothold part 100 to fix the unfolded state of the front foothold part 110 and the rear foothold part 130 and has a structure in which the middle handle part 220 is coupled with a carrying handle 300.

A wheel groove 111 opened upward is formed at the front of the front foothold part no and the wheel groove 111 is inserted with the rear wheel 12 when the rear foothold part 130 is folded so that the rear foothold part 130 adheres to the front foothold part 110.

Figure 1:
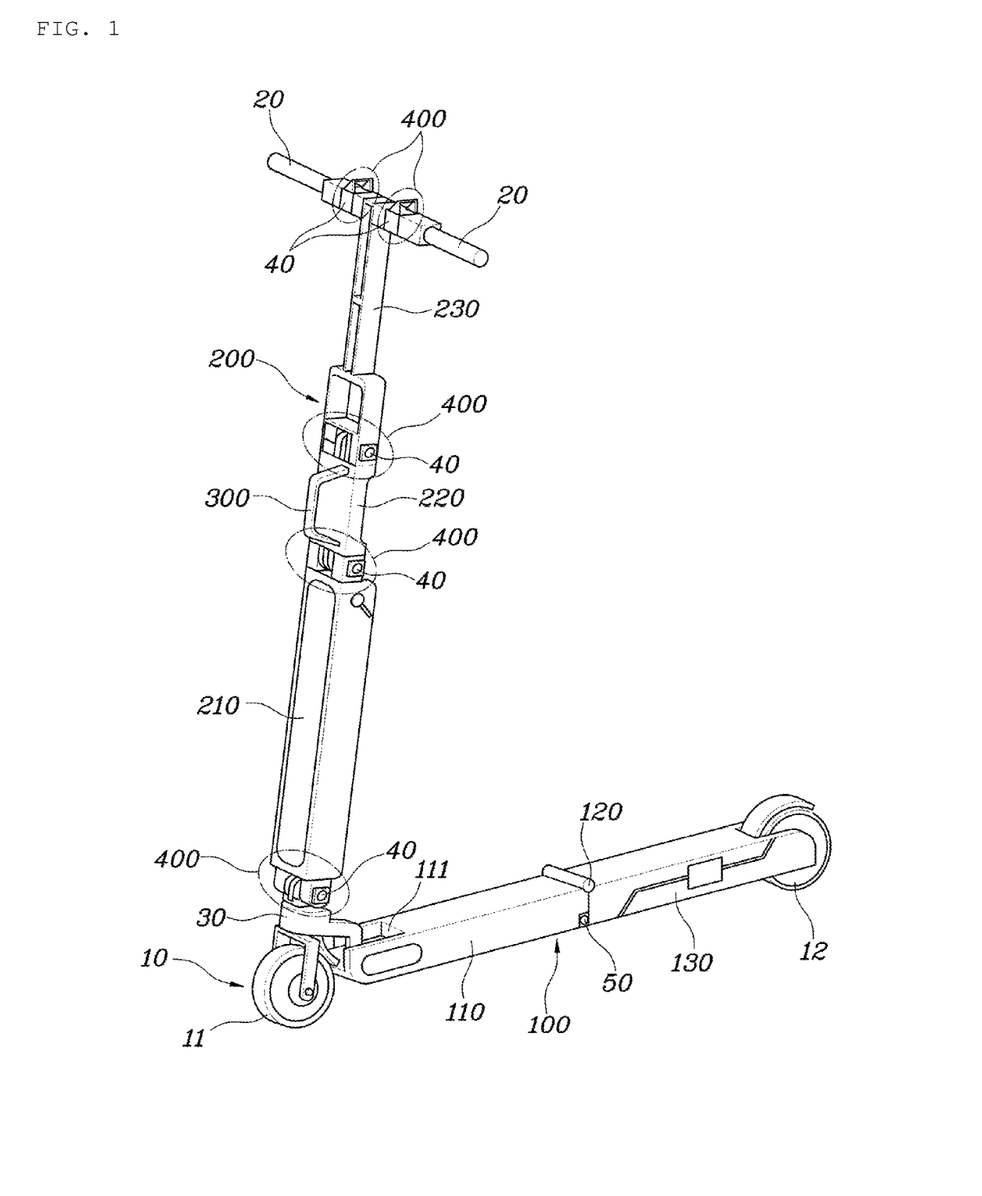
FIG. 1 is a perspective view of a folding personal mobility vehicle according to an exemplary embodiment of the present invention.
Figure 4:
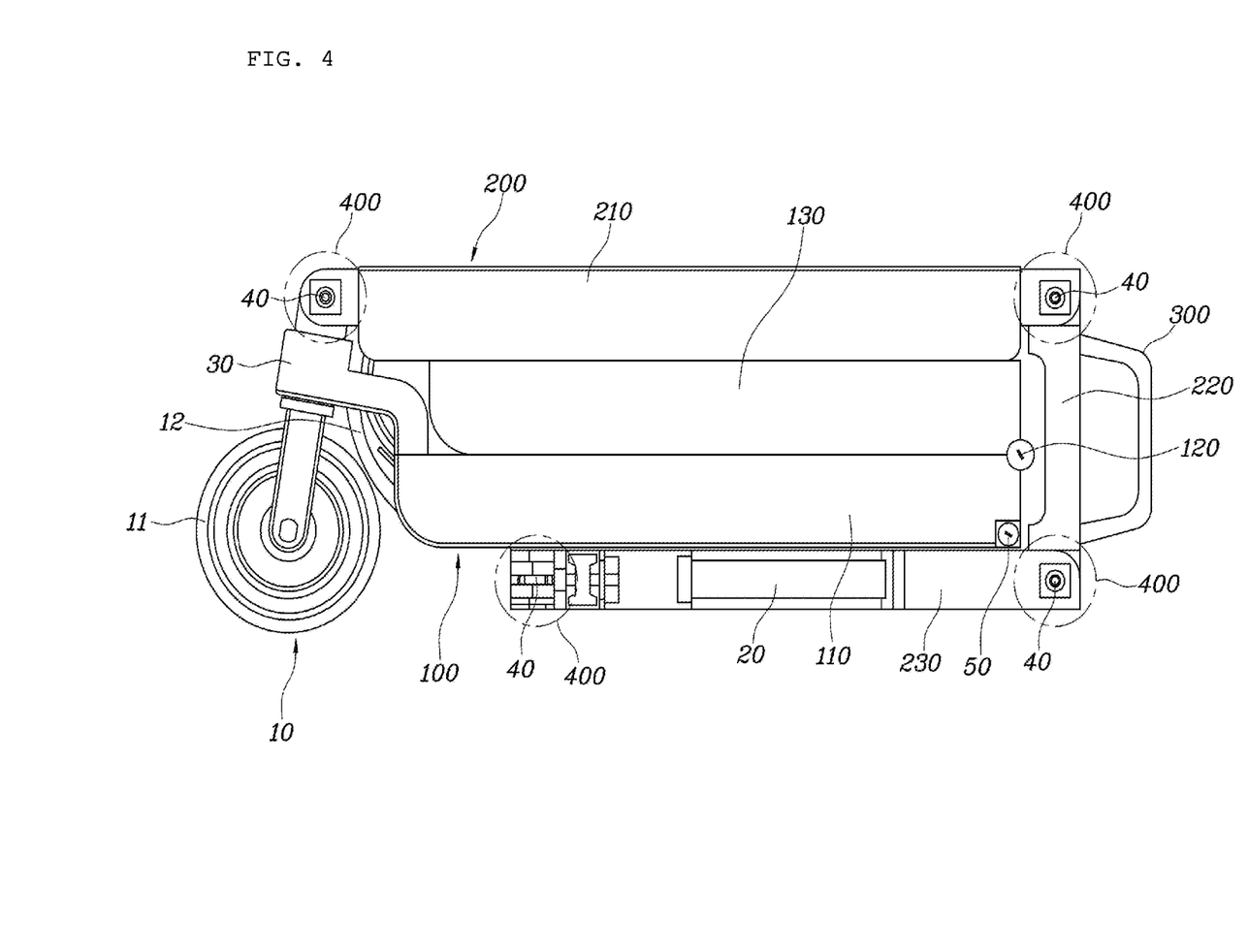
FIG. 4 is a view for explaining a folded state of the folding personal mobility vehicle according to the exemplary embodiment of the present invention.
Figure 6:
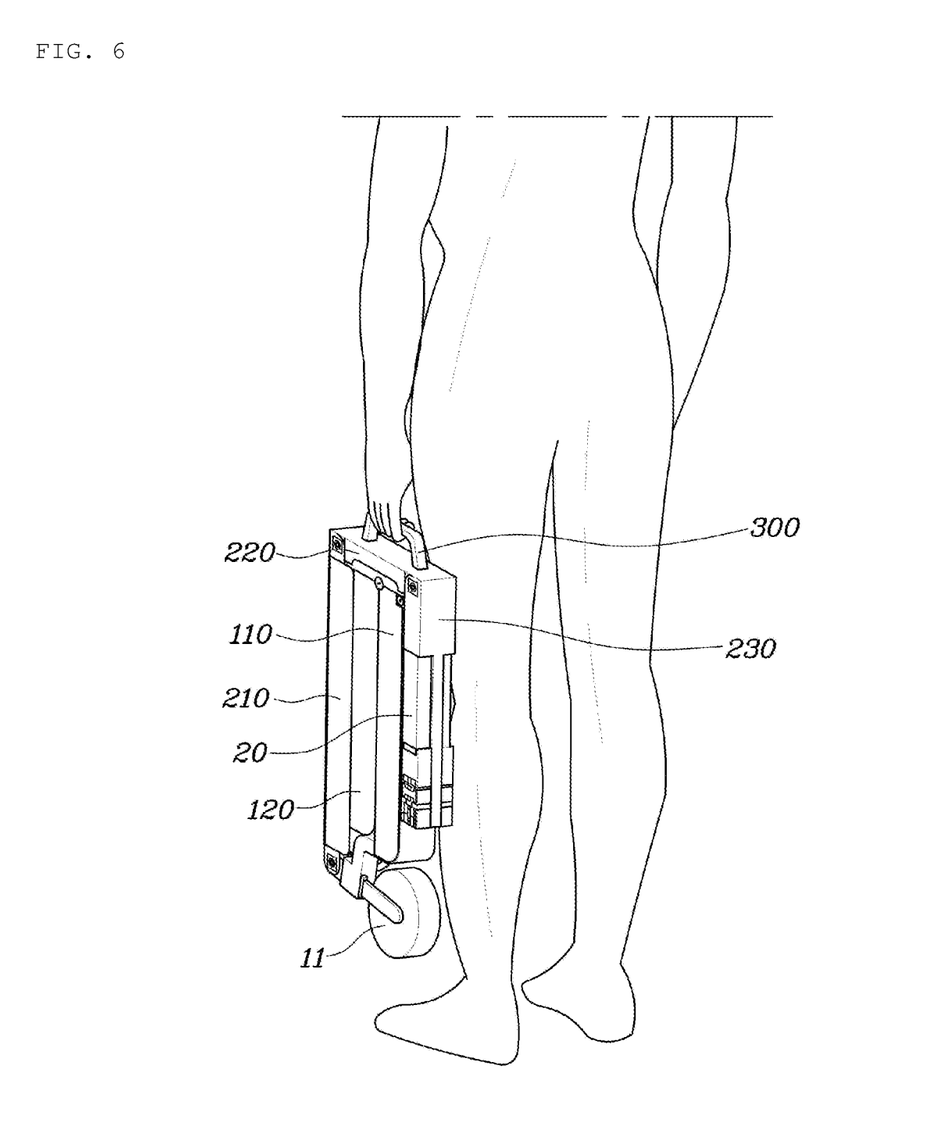
FIG. 6 is an example in which the personal mobility vehicle in the folded state is carried.

The folding personal mobility vehicle according to the exemplary embodiment of the present invention has a structure in which the folding personal mobility vehicle may be in the unfolded state (used state) as illustrated in FIG. 1 and may be in the folded state (carried and stored state) as illustrated in FIG. 4. In the state in which the folding personal mobility vehicle is unfolded as illustrated in FIG. 1, if the rear foothold part 130 is folded to adhere to the front foothold part 110, the lower handle part 210 is folded to adhere to the rear foothold part 130, the middle handle part 220 is folded to be positioned at one side of the front foothold part 110 and one side of the rear foothold part 130, the upper handle part 230 is folded to adhere to a bottom surface of the front foothold part 110, and the handle 20 is folded to adhere to both side surfaces of the upper handle part 230, the folding personal mobility vehicle is in an overlapping state by being completely folded as illustrated in FIG. 6, and in the state in which the folding personal mobility vehicle is folded as illustrated in FIG. 6, the lower handle part 210 and the rear foothold part 130 completely adhere to each other, the rear foothold part 130 and the front foothold part 110 completely adhere to each other, and the front foothold part 110 and the upper handle part 230 completely adhere to each other to prevent an empty space from being present between the lower handle part 210 and the rear foothold part 130, between the rear foothold part 130 and the front foothold part 110, and between the front foothold part 110 and the upper handle part 230 to minimize the volume of the folded state, such that the folding personal mobility vehicle may be effectively stored even in the narrow space and easily carried.

The lower handle part 210 and the middle handle part 220 and the upper handle part 230 and the handle 20 that are in the folded state as described above are each maintained in a folded state by the hinge locking mechanism 40.

That is, an upper end of the wheel carrier 30 and a lower end of the lower handle part 210, an upper end of the lower handle part 210 and a lower end of the middle handle part 220, an upper end of the middle handle part 220 and a lower end of the upper handle part 230, and an upper end of the upper handle part 230 and one end of the handle 20 each are a hinge part 400 that may implement the folding operation and the unfolding operation of the handle part 200, the hinge part 400 is configured so that a left flange 420 and a right flange 430 overlap with each other at left and right sides, having an inner flange 410 disposed therebetween, the left flange 420 and the right flange 430 are configured to be separated from the inner flange 410 while having an integrated structure in which they are connected to each other like a yoke shape, and the hinge locking mechanism 40 is installed at a part where the inner flange 410, the left flange 420, and the right flange 430 overlap with each other.

Figure 3:
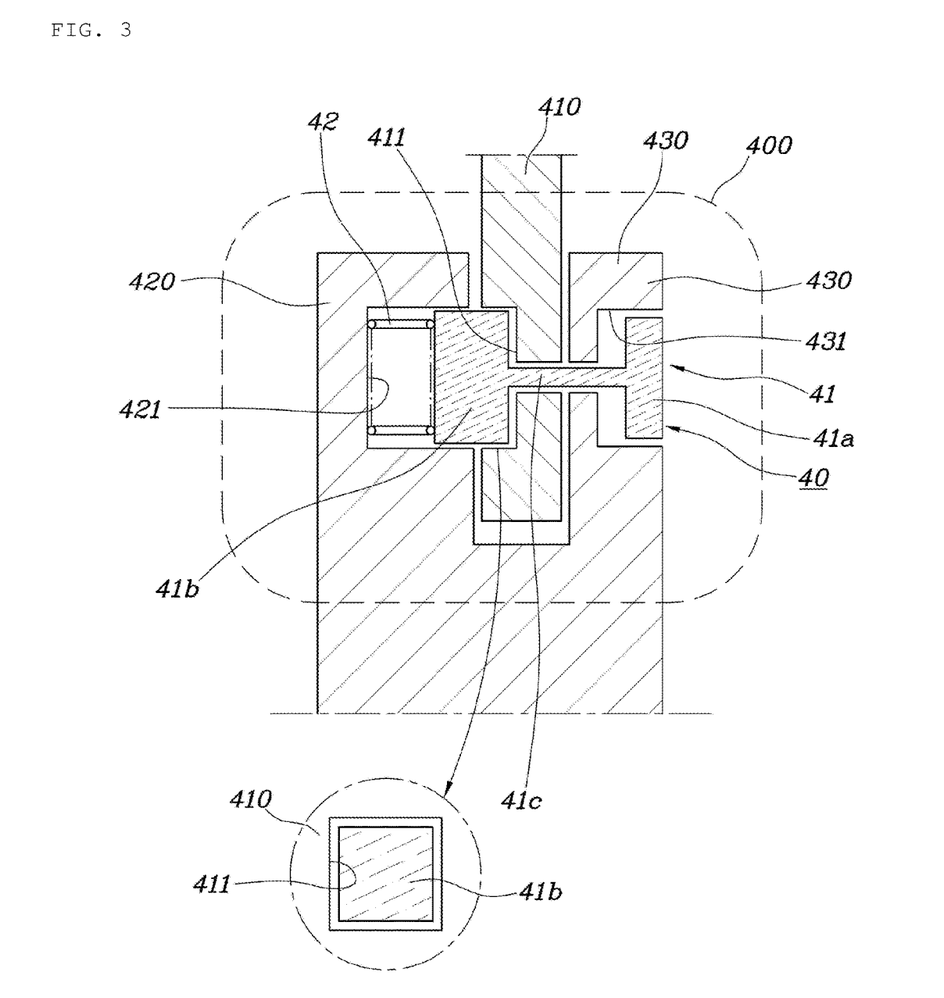
FIG. 3 is a view for explaining a hinge locking mechanism of a folding personal mobility vehicle according to an exemplary embodiment of the present invention.

The hinge locking mechanism 40 includes a locking pin 41 having a pressing part 41a of one end and a locking part 41b of the other end and a rod part 41c connecting between the pressing part 41a and the locking part 41b and a locking spring 42 for elastically supporting the locking part 41b of the locking pin 41.

The pressing part 41a is installed to be movable along a longitudinal direction of the rod part 41c while being inserted into an operating groove 431 formed at the right flange 430, the locking part 41b is installed to be separated from the locking groove 411 at the time of pressing the pressing part 41a while being installed to be simultaneously inserted into the locking groove 411 formed at the inner flange 410 and a release groove 421 formed at the left flange 420, and the rod part 41c is installed to connect between the pressing part 41a and the locking part 41b by penetrating through the right flange 430 and the inner flange 410.

The locking spring 42 has one end supported to the locking part 41b and the other end supported into the release groove 421 and thus is a compression spring for pressing the locking part 41b toward the pressing part 41a by the accumulated elastic force.

If a user presses the pressing part 41a and thus the locking part 41b is separated from the locking groove 411, the inner flange 410 and the left flange 420 and the right flange 430 that are integrated may relatively rotate with respect to the rod part 41c. In this case, the folding operation of the handle part 200 may be implemented by the relative rotation between the inner flange 410 and the left flange 420 and the right flange 430 that are integrated.

Meanwhile, the locking part 41b and the locking groove 411 have an outer circumference having a quadrangular cross section and thus the locking part 41b rotates by 90° when the inner flange 410 and the left flange 420 and the right flange 430 that are integrated relatively rotate with respect to the rod part 41c and then are maintained in the locked state again, that is, the locking part 41b rotates by 90° in the state in which it is released from the locking groove 411 and then the locking part 41b is inserted into the locking groove 411 again, such that they may be maintained in the locked state again.

A rear upper edge part of the front foothold part 110 and a front upper edge part of the rear foothold part 130 are rotatably coupled with each other via the hinge shaft 120 while overlapping with each other and the foothold locking mechanism 50 is installed under the hinge shaft 120.

Figure 2:
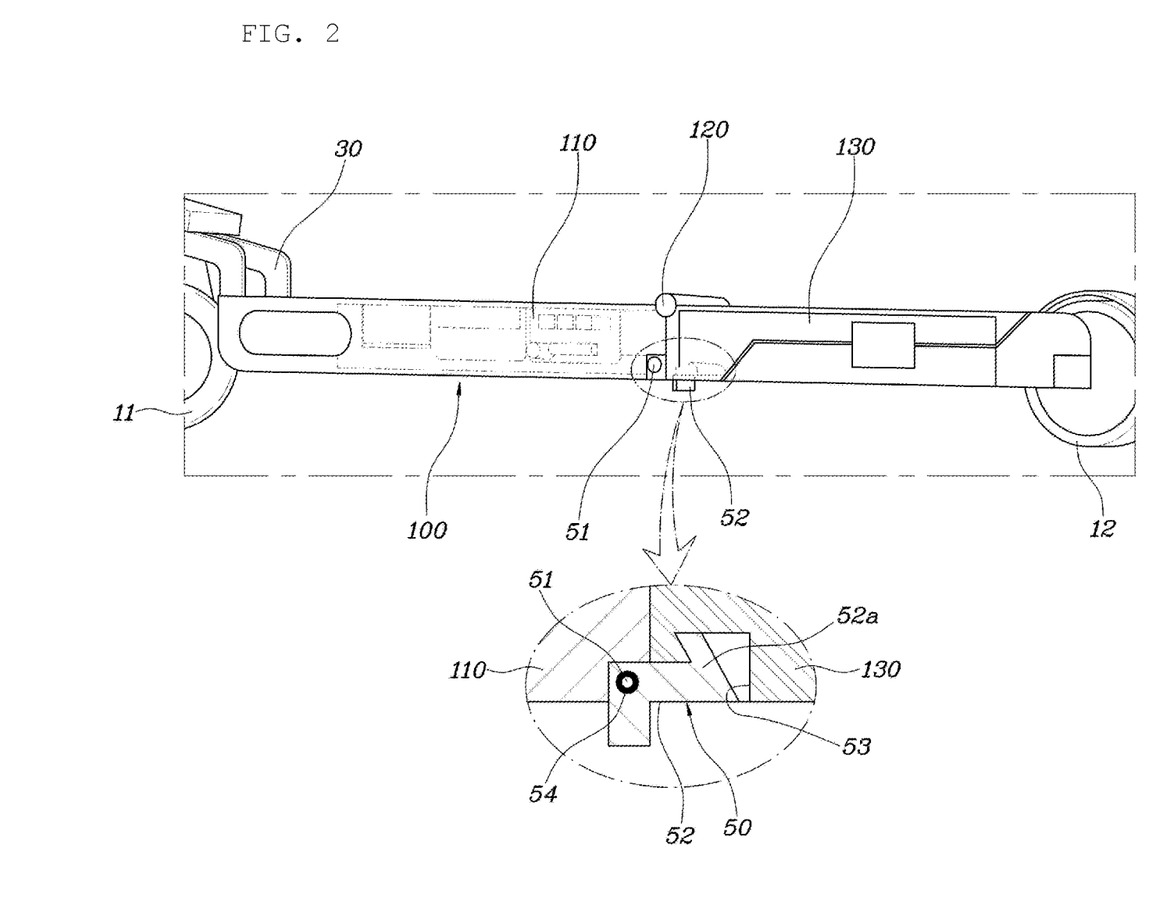
FIG. 2 is a view for explaining a foothold part and a foothold locking mechanism of FIG. 1.

The foothold locking mechanism 50 includes a locking lever 52 rotatably installed at a rear lower edge part of the front foothold part 110 via a lever shaft 51, a locking protruding groove 53 formed at a front lower edge part of the rear foothold part 130 so that a locking protrusion 52a formed at one end of the locking lever 52 is inserted into the locking protruding groove 53 and locked, and a lever spring 54 having one end fixed to the front foothold part 110 and the other end fixed to the lever shaft 52 while being wound around the lever shaft 52 and applying an elastic force so that the locking lever 52 may rotate in a direction in which the locking protrusion 52a is inserted into the locking protruding groove 53, such that the lever spring 54 is the torsion spring.

Therefore, as illustrated in FIG. 2, even if the user boards the foothold part 100 in the state in which the front foothold part 110 and the rear foothold part 130 are coupled with each other by the foothold locking mechanism 50 in the state in which the front foothold part 110 and the rear foothold part 130 are unfolded straightly, the front foothold part 110 and the rear foothold part 130 are kept on being unfolded straightly by the adhesion of the foothold locking mechanism 50.

Further, after the user releases the locking of the foothold locking mechanism 50, the rear foothold part 130 rotates upward with respect to the hinge shaft 120 so that the rear foothold part 130 adheres to the front foothold part 110. In this case, the foothold part 100 is folded as the rear wheel 12 is inserted into the wheel groove 111.

Figure 5:
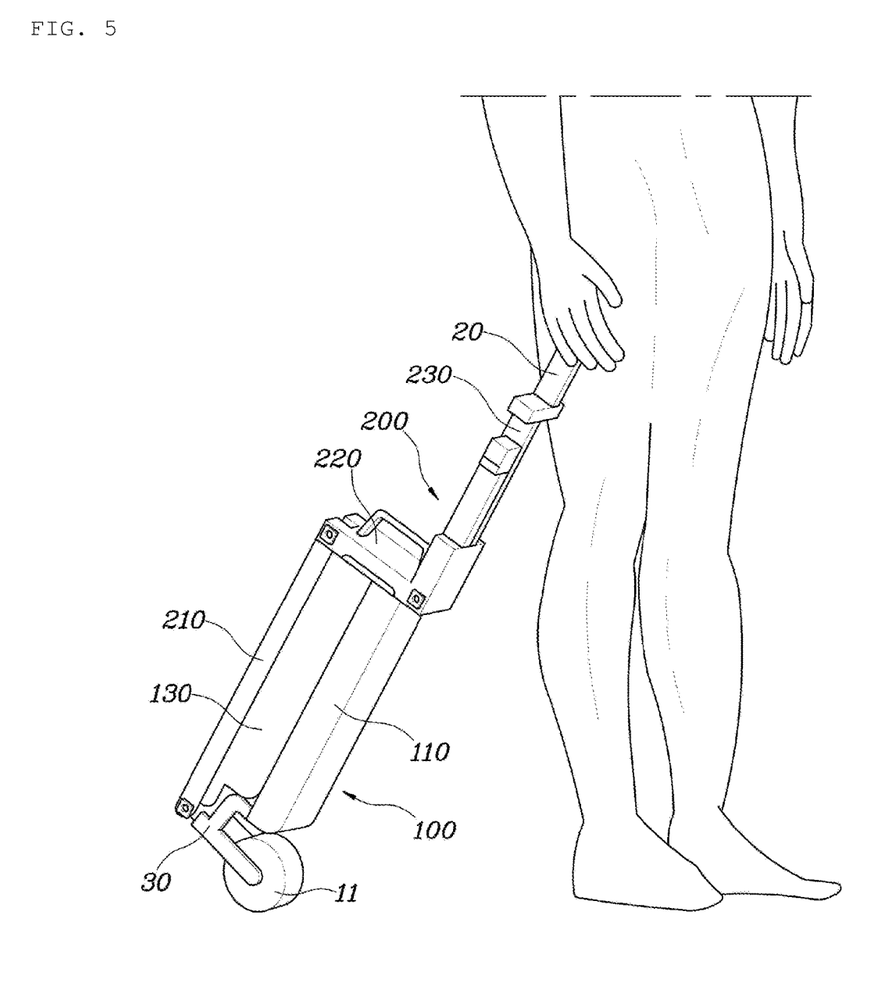
FIG. 5 is a view showing an example in which the personal mobility vehicle in the folded state is dragged.

In the folding personal mobility vehicle according to the exemplary embodiment of the present invention, as illustrated in FIG. 5, when the rear foothold part 130 is folded to adhere to the front foothold part 110, the lower handle part 210 is folded to adhere to the rear foothold part 130, the middle handle part 220 is folded to be positioned at one side of the front foothold part 110 and the rear foothold part 130, and the upper handle part 230 is unfolded to extend along the longitudinal direction of the front foothold part 110, the user holds the handle 20 to bring the front wheel 11 into contact with a ground surface and then drag the folding personal mobility vehicle.

Further, as illustrated in FIG. 6, when the lower handle part 210 is folded to adhere to the rear foothold part 130, the middle handle part 220 is folded to be positioned at one side of the front foothold part 110 and the rear foothold part 130, the upper handle part 230 is folded to adhere to the bottom surface of the front foothold part 110, the handle 20 is in the overlapping state by being completely folded to adhere to both side surfaces of the upper handle part 230, the user uses a carrying handle 300 provided at the middle handle part 220 to carry the folding personal mobility vehicle or store it in a luggage room or a trunk room of the vehicle.

As described above, the folding personal mobility vehicle according to the exemplary embodiment of the present invention including the foothold part 100 provided with the wheel 10 and the handle part 200 provided with the handle 20 like a kick board may prevent the empty space from being present between the lower handle part 210 and the rear foothold part 130, between the rear foothold part 130 and the front foothold part 110, and between the front foothold part 110 and the upper handle part 230 when being completely folded for carrying and storage to minimize the volume of the completely folded state, such that the folding personal mobility vehicle may be effectively stored even in the narrow space and easily carried.

According to the exemplary embodiment of the present invention, the folding personal mobility vehicle that includes the foothold part provided with the wheel and the handle part provided with the handle may prevent the empty space from being present between the lower handle part and the rear foothold part, between the rear foothold part and the front foothold part, and between the front foothold part and the upper handle part when being completely folded for carrying or storage to minimize the volume of the completely folded state, such that the folding personal mobility vehicle may be effectively stored even in the narrow space and easily carried.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A folding personal mobility vehicle comprising:
a front foothold part;
a wheel carrier coupled with a front of the front foothold part;
a front wheel coupled with the wheel carrier;
a rear foothold part rotatably coupled with the front foothold part via a hinge shaft;
a rear wheel coupled with a rear of the rear foothold part;
a lower handle part coupled with the wheel carrier via a hinge locking mechanism;
a middle handle part coupled with the lower handle part via the hinge locking mechanism;
an upper handle part coupled with the middle handle part via the hinge locking mechanism; and
a pair of handles coupled with the upper handle part via the hinge locking mechanism;
wherein the rear foothold part is folded to adhere to the front foothold part in a folded state; and
wherein the front foothold part is provided with a wheel groove into which the rear wheel is inserted when the rear foothold part is folded to adhere to the front foothold part.

2. The folding personal mobility vehicle of claim 1, further comprising a foothold locking mechanism provided on the front foothold part or the rear foothold part, the foothold locking mechanism to fix an unfolded state of the front foothold part and the rear foothold part.

3. The folding personal mobility vehicle of claim 1, further comprising a carrying handle coupled with the middle handle part.

4. The folding personal mobility vehicle of claim 1, wherein in the folded state
the lower handle part is folded to adhere to the rear foothold part;
the middle handle part is folded to be positioned at one side of the front foothold part and one side of the rear foothold part;
the upper handle part is folded to adhere to a bottom surface of the front foothold part; and
the handles are folded to adhere to both side surfaces of the upper handle part.

5. The folding personal mobility vehicle of claim 4, wherein the lower handle part, the middle handle part, the upper handle part, and the handles are each maintained in the folded state by the hinge locking mechanism.

6. The folding personal mobility vehicle of claim 1, further comprising a foothold locking mechanism provided on the front foothold part or the rear foothold part to fix an unfolded state of the front foothold part and the rear foothold part;
wherein a rear upper edge part of the front foothold part and a front upper edge part of the rear foothold part are rotatably coupled with each other via the hinge shaft while overlapping with each other;
wherein the foothold locking mechanism includes a locking lever rotatably installed at a rear lower edge part of the front foothold part via a lever shaft;
wherein a locking protruding groove is formed at a front lower edge part of the rear foothold part so that a locking protrusion formed at one end of the locking lever is inserted into the locking protruding groove and locked; and
wherein a lever spring having one end fixed to the front foothold part and another end fixed to the lever shaft while being wound around the lever shaft and is configured to apply an elastic force so that the locking lever rotates in a direction in which the locking protrusion is inserted into the locking protruding groove.

7. The folding personal mobility vehicle of claim 1, further comprising a carrying handle coupled with the middle handle part, wherein the front foothold part, the rear foothold part and the lower handle part overlap with each other by being completely folded and then the carrying handle provided on the middle handle part protrudes outwardly, and wherein and the folding personal mobility vehicle is configured so that a user can carry the folded personal mobility vehicle using the carrying handle.

8. The folding personal mobility vehicle of claim 1, wherein an upper end of the wheel carrier and a lower end of the lower handle part, an upper end of the lower handle part and a lower end of the middle handle part, an upper end of the middle handle part and a lower end of the upper handle part, and an upper end of the upper handle part and one end of each handle each are each a hinge part.

9. The folding personal mobility vehicle of claim 8, wherein:
the hinge part is configured so that a left flange and a right flange overlap with each other at left and right sides, having an inner flange disposed therebetween;
the left flange and the right flange are configured to be separated from the inner flange while having an integrated structure in which they are connected to each other like a yoke shape; and
the hinge locking mechanism is installed at a portion where the inner flange, the left flange, and the right flange overlap with each other.

10. The folding personal mobility vehicle of claim 9, wherein the hinge locking mechanism includes a locking pin having a pressing part of one end, a locking part of another end and a rod part connecting between the pressing part and the locking part;
wherein the hinge locking mechanism also includes a locking spring for elastically supporting the locking part of the locking pin;
wherein the pressing part is installed to be movable along a longitudinal direction of the rod part while being inserted into an operating groove formed at the right flange;
wherein the locking part is installed to be separated from a locking groove formed at the inner flange by pressing the pressing part while being installed to be simultaneously inserted into the locking part formed at the inner flange and a release groove formed at the left flange;
wherein the rod part is installed to connect between the pressing part and the locking part by penetrating through the right flange and the inner flange; and
wherein the locking spring has one end supported to the locking part and another end supported into the release groove to press the locking part toward the pressing part by an accumulated elastic force.

11. The folding personal mobility vehicle of claim 10, wherein when the pressing part is pressed and thus the locking part is separated from the locking groove formed at the inner flange, the inner flange and the left flange and the right flange that are integrated relatively rotate with respect to the rod part, and
wherein a folding operation of each handle part can be performed by a rotation between the inner flange and the left flange and the right flange that are integrated.

12. The folding personal mobility vehicle of claim 10, wherein the locking part and the locking groove have an outer circumference having a quadrangular cross section and thus the locking part rotates by 90° when the inner flange and the left flange and the right flange that are integrated relatively rotate with respect to the rod part and then are maintained in a locked state.

13. A folding personal mobility vehicle comprising:
a front foothold part;
a wheel carrier coupled with a front of the front foothold part;
a front wheel coupled with the wheel carrier;
a rear foothold part rotatably coupled with the front foothold part via a hinge shaft;
a rear wheel coupled with a rear of the rear foothold part;
a lower handle part coupled with the wheel carrier via a hinge locking mechanism;
a middle handle part coupled with the lower handle part via the hinge locking mechanism;
an upper handle part coupled with the middle handle part via the hinge locking mechanism; and
a pair of handles coupled with the upper handle part via the hinge locking mechanism;
wherein in a folded state
the lower handle part is folded to adhere to the rear foothold part;
the middle handle part is folded to be positioned at one side of the front foothold part and one side of the rear foothold part;
the upper handle part is unfolded to extend along a longitudinal direction of the front foothold part; and
the folding personal mobility vehicle is configured so that a user holding the handles can bring the front wheel into contact with a ground surface and then drag the folding personal mobility vehicle.

14. The folding personal mobility vehicle of claim 13, wherein the rear foothold part is folded to adhere to the front foothold part in the folded state; and
wherein the front foothold part is provided with a wheel groove into which the rear wheel is inserted when the rear foothold part is folded to adhere to the front foothold part.

15. The folding personal mobility vehicle of claim 13, further comprising a foothold locking mechanism provided on the front foothold part or the rear foothold part, the foothold locking mechanism to fix an unfolded state of the front foothold part and the rear foothold part.

16. The folding personal mobility vehicle of claim 13, further comprising a carrying handle coupled with the middle handle part.

17. A folding personal mobility vehicle comprising:
a front foothold part;
a wheel carrier coupled with a front of the front foothold part;
a front wheel coupled with the wheel carrier;
a rear foothold part rotatably coupled with the front foothold part via a hinge shaft;
a rear wheel coupled with a rear of the rear foothold part;
a lower handle part coupled with the wheel carrier via a hinge locking mechanism;
a middle handle part coupled with the lower handle part via the hinge locking mechanism;
an upper handle part coupled with the middle handle part via the hinge locking mechanism; and
a pair of handles coupled with the upper handle part via the hinge locking mechanism;
wherein an upper end of the wheel carrier and a lower end of the lower handle part, an upper end of the lower handle part and a lower end of the middle handle part, an upper end of the middle handle part and a lower end of the upper handle part, and an upper end of the upper handle part and one end of each handle each are each a hinge part;
wherein the hinge part is configured so that a left flange and a right flange overlap with each other at left and right sides, having an inner flange disposed therebetween;
wherein the left flange and the right flange are configured to be separated from the inner flange while having an integrated structure in which they are connected to each other like a yoke shape; and
wherein the hinge locking mechanism is installed at a portion where the inner flange, the left flange, and the right flange overlap with each other.

18. The folding personal mobility vehicle of claim 17, wherein the hinge locking mechanism includes a locking pin having a pressing part of one end, a locking part of another end and a rod part connecting between the pressing part and the locking part;
- wherein the hinge locking mechanism also includes a locking spring for elastically supporting the locking part of the locking pin;
- wherein the pressing part is installed to be movable along a longitudinal direction of the rod part while being inserted into an operating groove formed at the right flange;
- wherein the locking part is installed to be separated from a locking groove formed at the inner flange by pressing the pressing part while being installed to be simultaneously inserted into the locking part formed at the inner flange and a release groove formed at the left flange;
- wherein the rod part is installed to connect between the pressing part and the locking part by penetrating through the right flange and the inner flange; and
- wherein the locking spring has one end supported to the locking part and another end supported into the release groove to press the locking part toward the pressing part by an accumulated elastic force.

19. The folding personal mobility vehicle of claim 18, wherein when the pressing part is pressed and thus the locking part is separated from the locking groove formed at the inner flange, the inner flange and the left flange and the right flange that are integrated relatively rotate with respect to the rod part, and
- wherein a folding operation of each handle part can be performed by a rotation between the inner flange and the left flange and the right flange that are integrated.

20. The folding personal mobility vehicle of claim 18, wherein the locking part and the locking groove have an outer circumference having a quadrangular cross section and thus the locking part rotates by 90° when the inner flange and the left flange and the right flange that are integrated relatively rotate with respect to the rod part and then are maintained in a locked state.

* * * * *